United States Patent
Söderlund et al.

(10) Patent No.: US 9,816,439 B2
(45) Date of Patent: Nov. 14, 2017

(54) FAIRING OF A GAS TURBINE STRUCTURE

(75) Inventors: Harald Söderlund, Vargön (SE); Andreas Borg, Trollhättan (SE)

(73) Assignee: GKN Aerospace Sweden AB, Trollhattan (SE)

(*) Notice: Subject to any disclaimer, the term of this patent is extended or adjusted under 35 U.S.C. 154(b) by 911 days.

(21) Appl. No.: 14/117,255

(22) PCT Filed: May 16, 2011

(86) PCT No.: PCT/SE2011/000084
§ 371 (c)(1),
(2), (4) Date: Dec. 27, 2013

(87) PCT Pub. No.: WO2012/158070
PCT Pub. Date: Nov. 22, 2012

(65) Prior Publication Data
US 2014/0190180 A1    Jul. 10, 2014

(51) Int. Cl.
*F02C 7/20*    (2006.01)
*F01D 25/16*    (2006.01)
*F01D 9/04*    (2006.01)

(52) U.S. Cl.
CPC .............. *F02C 7/20* (2013.01); *F01D 25/162* (2013.01); *F01D 9/041* (2013.01); *F05D 2230/642* (2013.01)

(58) Field of Classification Search
CPC .......... F02C 7/20; F01D 25/162; F01D 9/041; F05D 2230/642
See application file for complete search history.

(56) References Cited

U.S. PATENT DOCUMENTS

| | | |
|---|---|---|
| 4,571,935 A | 2/1986 | Rice |
| 4,993,918 A | 2/1991 | Myers et al. |
| 2010/0135777 A1* | 6/2010 | Manteiga ............ F01D 9/02 415/190 |

FOREIGN PATENT DOCUMENTS

| | | |
|---|---|---|
| EP | 1544414 B1 | 6/2005 |
| EP | 2192269 A2 | 6/2010 |

OTHER PUBLICATIONS

International Search Report (dated Feb. 1, 2012) for corresponding International Application PCT/SE2011/000084.

* cited by examiner

*Primary Examiner* — Ryan J Walters
(74) *Attorney, Agent, or Firm* — Bejin Bieneman PLC (57) ABSTRACT

A gas turbine structure includes a first housing and a second housing, one of the first and second housings being located around the other of the first and second housings such that a core flow passage is obtained between the first and second housings. The gas turbine structure further includes an elongate structural member extending in a structural member direction from the first housing to the second housing and the gas turbine structure further includes a fairing circumferentially enclosing at least a portion of the structural member.

14 Claims, 10 Drawing Sheets

FAIRING OF A GAS TURBINE STRUCTURE

BACKGROUND AND SUMMARY

The present disclosure relates to a gas turbine structure. Moreover, the present disclosure relates to a gas turbine engine. Furthermore, the present disclosure relates to an aeroplane.

A gas turbine engine may be used as a jet engine. The term jet engine includes various types of engines, which admit air at relatively low velocity, heat it by combustion and shoot it out at a much higher velocity.

Accommodated within the term jet engine are, for example, turbojet engines and turbo-fan engines. The invention will below be described for a turbo-fan engine, but may of course also be used for other engine types.

A gas turbine structure, which may sometimes be denoted a case or frame, is used for supporting and carrying bearings, which in turn, rotatably support rotors. Conventional turbo hut engines have a fan frame, a mid-frame and an aft turbine frame. These frames constitute a gas turbine structure including a first housing, a second housing and a strut or a vane having a first end of the strut or vane being attached to the first housing and a second end being attached to the second housing.

Depending on the position of the gas turbine structure in the gas turbine, the gas turbine structure, and in particular the strut and/or vane thereof, may be imparted large loads, such as thermal loads from the gas path temperature.

In order to reduce the thermal load on the vane, U.S. Pat. No. 4,993,918 proposes that the vane is furnished with a fairing extending from a first ring to a second ring. However the provision of a '918 fairing makes inspection of the enclosed vane difficult. Additionally, it may be difficult to replace a '918 fairing, again due to the tight tolerances required for the fairing.

It is desirable to provide a gas turbine structure which overcomes or ameliorates at least one of the disadvantages of the prior art, or to provide a useful alternative.

As such, the present disclosure relates to a gas turbine structure comprising a first housing and a second housing, one of the first and second housings being located around the other of the first and second housings such that a core flow passage is obtained between the first and second housings. The gas turbine structure further comprises an elongate structural member extending in a structural member direction from the first housing to the second housing.

According to the present disclosure, the gas turbine structure may preferably be used in a position in a gas turbine such that a hot core flow is guided between the first and second housings, i.e. that a hot core flow passage is obtained between the first and second housings. As such, the gas turbine structure of the present disclosure may preferably be intended to be positioned downstream of a combustor of a gas turbine.

As used herein, the expression "housing" relates to member which has at least a circumferential extension. However, the circumferential extension does not necessarily have to be circular but may in some implementations of the housing instead be oval, rectangular or any other type of shape.

The structural member between the first and second housings is often referred to as a strut or a vane. As used herein, the expression "strut" relates to a structural member which has a symmetrical cross section with respect to the intended flow direction of the core flow passage whereas the expression "vane" relates to a structural member which has an asymmetrical cross section with respect to the intended flow direction.

The gas turbine structure further comprises a fairing circumferentially enclosing at least a portion of the structural member; the fairing extends in a fairing direction which is substantially parallel to the structural member direction.

The fairing comprises a fairing attachment portion, attached to the first housing such that a displacement at least in said fairing direction of said fairing attachment portion in relation to said first housing is prevented. The fairing further comprises a fairing end portion located at the other end of the fairing in the fairing extension direction as compared to the fairing attachment portion. The fairing end portion is allowed to be displaced, in at least the fairing direction, in relation to the second housing.

Preferably, the fairing end portion is allowed to be displaced, in at least the fairing direction, in relation to the second housing by virtue of the fact that the gas turbine structure comprises a gap, measured in the fairing direction, between the fairing end portion and at least a portion of the second housing.

With a gas turbine structure according to the above, a portion of the faring is locked from displacement, at least in the fairing extension, in relation to the first housing but not in relation to the second housing. The above implies that the fairing may be allowed to expand, e.g. when subjected to thermal loads, which results in that contraction forces in the fairing may be low and in some embodiments of the present disclosure the contraction forces in the fairing may even be removed.

Moreover, since the fairing is not attached to the second housing, there is often not a need for manufacturing the fairing with close tolerances, at least not with close tolerances of the fairing in the fairing direction. Thus, the gas turbine structure according to the above implies that the manufacturing cost and/or manufacturing time may be reduced as compared to prior art gas turbines having struts which are furnished with fairings attached to the first housing as well as the second housing.

Furthermore, the fact that the fairing is not attached to the second housing may facilitate the replacement of a fairing.

Additionally, since the structural member is located in the core flow passage, the structural member may be subjected to thermal loads when the gas turbine, of which the above gas turbine structure forms a part, is operated. However, since the fairing may cover at least a portion of the structural member, the thermal loads imparted on that portion may be reduced. This in turn implies that the portion of the structural member may be made of a material with lower thermal characteristics as compared to a gas turbine structure without fairings.

The design and the material of the portion of the structural member which is covered by the fairing could instead be chosen with a focus on an appropriate structural capacity. As such, by virtue of the use of a fairing, the covered portion of the structural member may be designed with fewer constraints on the shape of the structural member and the first or second housing due to the separated functionality between the structural member and the fairing. On the other hand, the fairing may be designed with a focus on an appropriate thermal capacity and/or on appropriate aerodynamic properties.

Purely by way of example, each one of the fairing and the portion of the structural member which is covered by the fairing may comprise a leading edge and a trailing edge.

Each one of the radius of the leading edge and the radius of the trailing edge of the fairing may be relatively small such that appropriate aerodynamic properties of the fairing are obtained whereas the radii of the leading and trailing edges of the covered portion of the structural member may be relatively large, i.e. at least larger than the radii of the fairing, in order to obtain appropriate structural properties of that portion of the structural member. Moreover, the radii of the structural member may increase towards the first housing.

Purely by way of example, the radius of the leading edge of a covered portion of the structural member may be 5 times larger, preferably 10 times larger, than the radius of the leading edge of the fairing covering that portion of the structural member. In a similar vein, and again purely by way of example, the radius of the trailing edge of a covered portion of the structural member may be 5 times larger, preferably 10 times larger, than the radius of the trailing edge of the fairing covering that portion of the structural member.

According to the present disclosure, the structural member may comprise a first stand-up and an intermediate member. The first stand-up may be attached to the first housing and the intermediate member may be attached to the first stand-up by means of a first stand-up joint. At least a portion of the fairing may extend past the first stand-up joint in the structural member direction.

As has previously been discussed, the stand-up, which thus constitutes at least a portion of the structural member which is at least partially covered by the fairing, may be designed with a focus on an appropriate structural capacity. The intermediate member, or at least the portion of the intermediate member extending past the fairing in the structural member direction, may be made of a material with better thermal characteristics, e.g. a higher thermal resistance, than the first stand-up.

According to the present disclosure, the structural member may have a structural member length in the structural member direction from the first housing to the second housing and the fairing may have a fairing length from the first housing in the fairing direction. The fairing length may be smaller than the structural member length. However, the fairing length may preferably be at least 10 mm.

According to the present disclosure, the fairing length may be less than 90%, preferably less than 50%, more preferred less than 30%, of the structural member length.

A fairing having a fairing length in any of the above ranges implies that a replacement of the fairing is straightforward. Moreover, a fairing length with any of the above ranges may render an inspection, such as a visual inspection, of the fairing and/or the structural member possible.

According to the present disclosure, the structural member may comprise a leading structural member portion and a trailing structural member portion, the trailing structural member portion may be arranged to be located downstream of the leading structural member portion when the gas turbine engine is operated to produce a core fluid flow through the gas turbine structure. The fairing may comprise a first fairing portion and a second fairing portion wherein the first fairing portion may cover the leading structural member portion and the second fairing portion may cover the trailing structural member portion. The first fairing portion and the second fairing portion may contact one another in a contacting area comprising a first axial split line and a second axial split line.

The above implementation of the fairing may facilitate a process step of mounting and/or replacing a fairing.

According to the present disclosure, the fairing may comprise a leading edge and a trailing edge. Moreover, the fairing may extend from the leading edge to the trailing edge along a mean camber line.

The mean camber line is defined as the locus of points halfway between the leading edge and the trailing edge as measured perpendicular to the mean camber line itself.

The fairing may further have a fairing thickness measured in a direction perpendicular to the mean camber line. The fairing may further have a maximum thickness between the leading edge and the trailing edge and the fairing may also have a suction side and a pressure side. The first axial split line may be located on the suctions side between the maximum thickness and the trailing edge when measured along the mean camber line.

With the above position of the first axial split line, the first axial split line may have a low influence on the flow around the fairing.

According to the present disclosure, the second axial split line may be located on the pressure side and the second axial split line may be located closer to the leading edge, when measured along the mean camber line, than the first split line.

The above position of the second axial split line implies that the first fairing portion and the second fairing portion may be at least similar in size. This may be advantageous from e.g. a fairing manufacturing, fairing handling and/or fairing mounting point of view.

According to the present disclosure, the forward portion may overlap the rearward portion in the contacting area. The above overlap may result in that the flow around the fairing is not adversely impaired, at least not to any greater extent.

According to the present disclosure, each one of the first fairing portion and the second fairing portion may comprise a sheet metal portion.

According to the present disclosure, the structural member may comprise a structural member outer surface and the fairing may comprise an inner fairing surface. The gas turbine structure may further comprise a fairing gap being the distance in a direction normal to the structural member outer surface from the structural member outer surface to the fairing inner surface. The gas turbine structure may comprise a fairing closure and the fairing closure may be configured such that the fairing gap at the fairing closure is smaller than the average fairing gap at the remaining portion of the fairing.

The fairing closure may reduce the amount of hot gas entering a volume enclosed between the fairing and the structural member. This in turn may result in a reduced thermal loading on at least a portion of the structural member.

According to the present disclosure, the smallest distance between the fairing closure and the structural member may be less than 50%, preferably less that 30%, of the smallest distance between the remaining portion of the fairing and the structural member.

According to the present disclosure, the fairing closure may comprise a flanged portion of said fairing.

According to the present disclosure, the fairing may be attached to the first housing by means of a releasable joint, preferably a bolt and/or a rivet joint.

According to the present disclosure, the gas turbine structure may comprise an additional fairing circumferentially enclosing at least a portion of the circumference of the structural member. The additional fairing may extend in an additional fairing direction substantially parallel to the structural member direction. Moreover, the additional fairing may comprise an additional fairing attachment portion attached to the second housing such that a displacement of the additional fairing attachment portion in relation to the second housing is prevented at least in the additional fairing direction. Furthermore, the additional fairing may comprise an additional fairing end portion located at the other end of the additional fairing in the additional fairing extension direction as compared to the additional fairing attachment portion. The additional fairing end portion may be allowed to be displaced, in at least the additional fairing direction, in relation to the first housing.

According to the present disclosure, the gas turbine structure may comprise a plurality of structural members.

According to the present disclosure, a plurality of the structural members may comprise a fairing.

According to the present disclosure, the gas turbine structure may be a rear gas turbine structure.

A second aspect of the present disclosure relates to a gas turbine engine comprising a gas turbine structure according to the first aspect of the present disclosure.

A third aspect of the present disclosure relates to an aeroplane comprising a gas turbine engine according to the second aspect of the present disclosure.

Further advantages and advantageous features of the disclosure are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
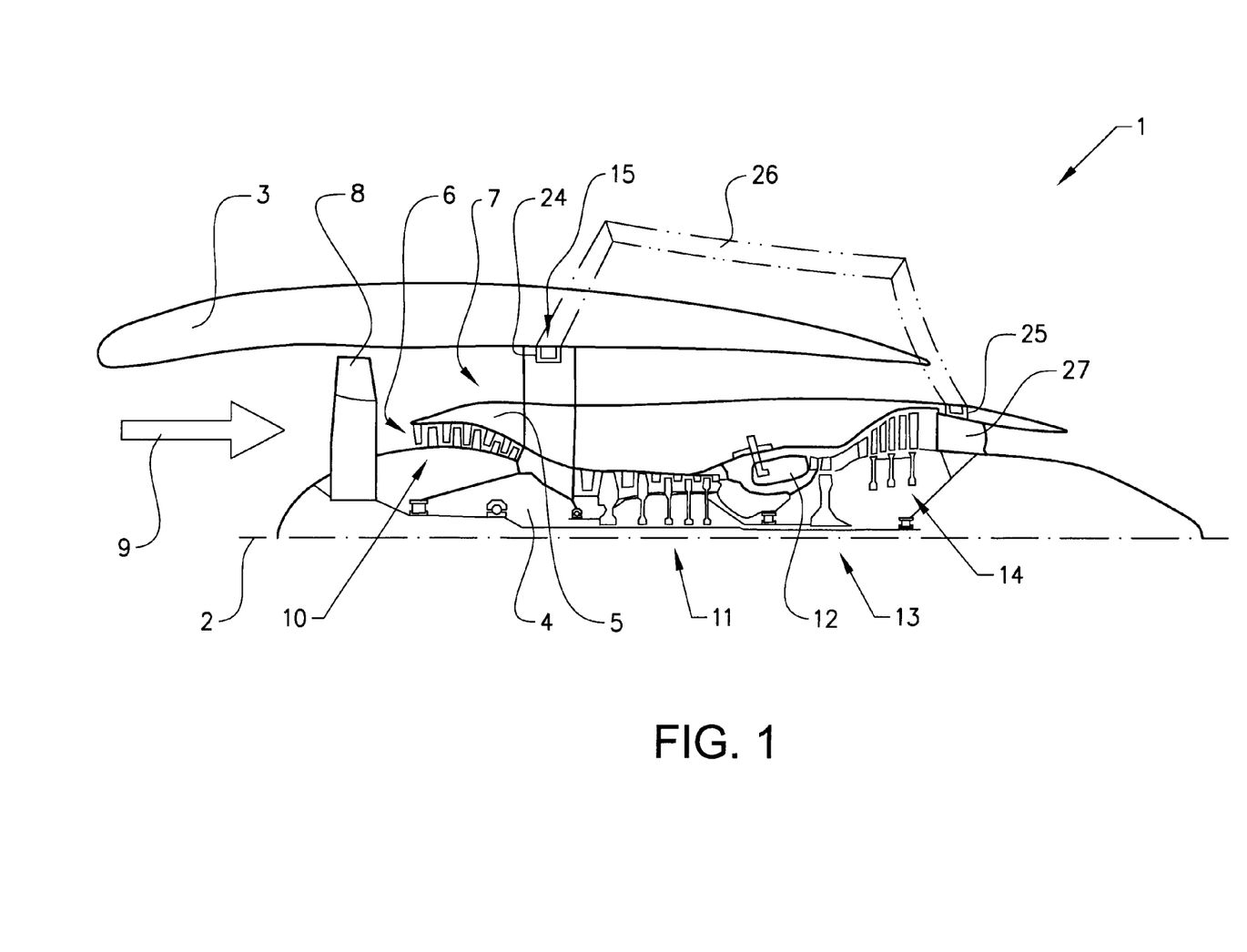
FIG. 1 illustrates a gas turbine engine.

The invention will below be described for a turbofan gas turbine aircraft engine 1, which in FIG. 1 is circumscribed about an engine longitudinal central axis 2. The engine 1 comprises an second casing 3, or nacelle, an first casing 4, and an intermediate casing 5, which is concentric to the first two casings and divides the gap between them into an first primary gas channel 6, or core duct, for the compression of air and a secondary channel 7 in which the engine bypass air flows. Thus, each of the gas channels 6, 7 may be annular in a cross section perpendicular to the engine longitudinal central axis 2.

The engine 1 comprises a fan 8 which receives ambient air 9, a booster or low pressure compressor (LPC) 10 and a high pressure compressor (HPC) 11 arranged in the primary gas channel 6, a combustor 12 which mixes fuel with the air pressurized by the high pressure compressor 11 for generating combustion gases which flow downstream through a high pressure turbine (HPT) 13 and a low pressure turbine (LPT) 14 from which the combustion gases are discharged from the engine.

A high pressure shaft joins the high pressure turbine 13 to the high pressure compressor 11 to form a high pressure rotor. A low pressure shaft joins the low pressure turbine 14 to the low pressure compressor 10 to form a low pressure rotor. The high pressure compressor 11, combustor 12 and high pressure turbine 13 are collectively referred to as a core engine. The low pressure shaft is at least in part rotatably disposed co-axially with and radially inwardly of the high pressure rotor. A load carrying, torsionally rigid engine structure 15, in the following referred to as a static component, is arranged between the low pressure compressor 10 and the high pressure compressor 11 in the axial direction of the engine 1. The load carrying static component is also known as a case, housing or gas turbine structure. The load carrying, torsionally rigid engine structure 15 is highly loaded during certain periods of a normal operating cycle of the engine.

The engine 1 is mounted to the aircraft (not shown) at a forwardly located fan gas turbine structure forward mount 24 on the static component 15 and at a rearwardly located turbine gas turbine structure aft mount 25 on a gas turbine structure 27 or a turbine rear frame. A mount system 26, normally comprising a pylon extending downwards from an aircraft wing and associated thrust links, is schematically indicated in FIG. 1. The mount system 26 is secured to the forward and aft mounts 24, 25.

Figure 2:
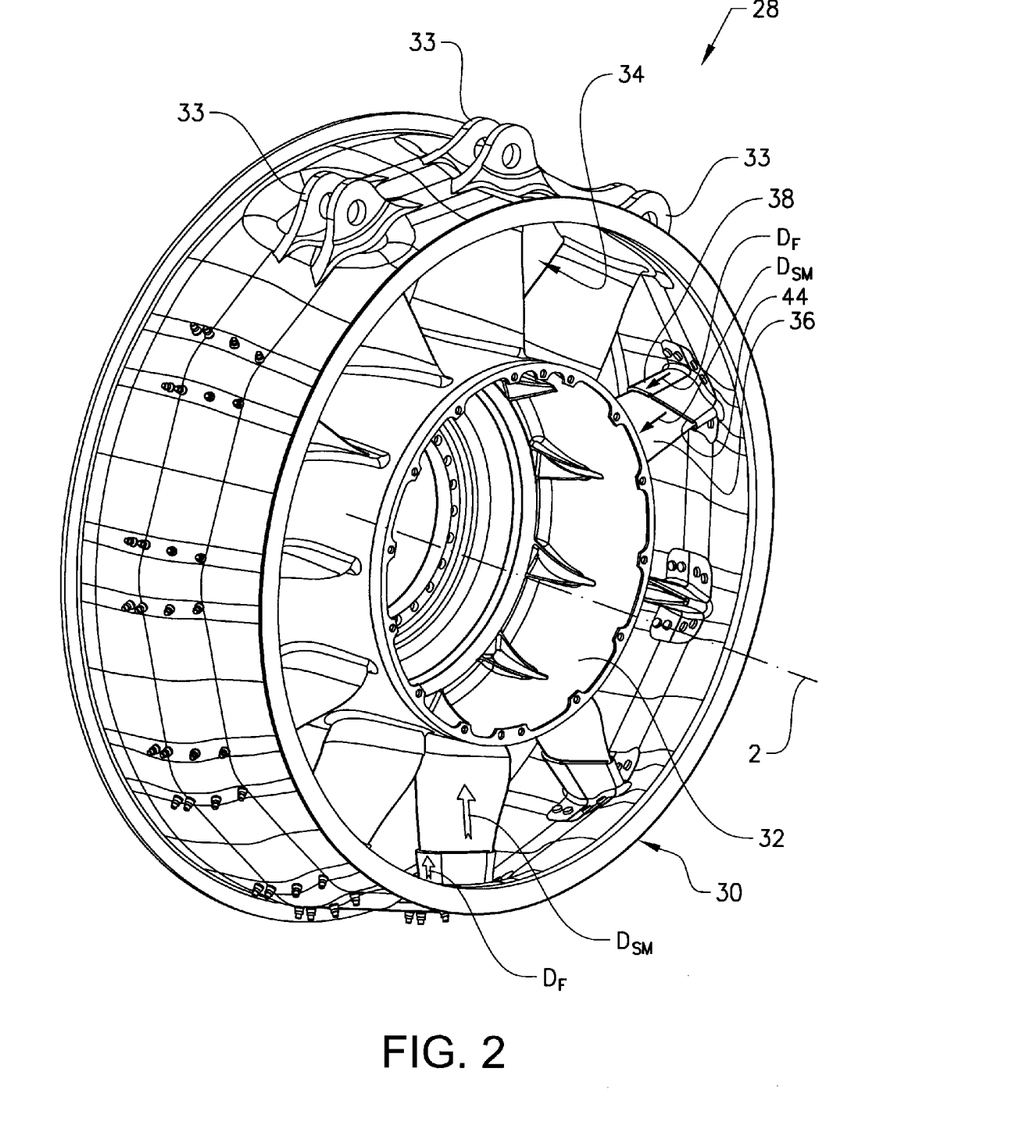
FIG. 2 illustrates a perspective view of an embodiment of a gas turbine structure.

FIG. 2 illustrates a perspective view of an embodiment of a gas turbine structure 28 according to the present invention. The FIG. 2 embodiment of the gas turbine structure 28 comprises a first housing 30 and a second housing 32.

Generally, one of the first and second housings 30, 32 is located around the other of the first and second housings 30, 32 such that a core flow passage 34 is obtained between the first and second housings 30, 32. In the FIG. 2 embodiment of the gas turbine structure 28 the first housing 30 is located around the second housing 32 such that the first housing 30 may be referred to as an outer housing and the second housing 32 may be referred to as an inner housing. However, in other embodiments of the gas turbine structure 28, the second housing 32 may be located around the first housing 30 and the second housing 32 may in such an embodiment be referred to as the outer housing.

The core flow passage 34 is adapted to form a primary gas channel 6, or core duct, of a gas turbine and the gas turbine structure 28 may preferably be used in positions of a gas turbine which are located downstream of the combustor 12 such that the core flow passage 34 is adapted to conduct a core flow with a high temperature. As such, gas turbine structure 28 of the present invention may preferably be a rear gas turbine structure.

Moreover, the gas turbine structure 28 of the present invention may preferably be used as at least forming a part of the aft mount 25 illustrated in FIG. 1. As such, the gas turbine structure 28 if FIG. 2 may constitute, or form a part of, the gas turbine structure 27, or turbine rear frame, illustrated in FIG. 1.

As may be gleaned from FIG. 2, the gas turbine structure 28 further comprises an elongate structural member 36 extending in a structural member direction $D_SM$ from the first housing 30 to the second housing 32. In fact, FIG. 2 illustrates that the gas turbine structure 28 comprises a plurality of structural members each one of which extends from the first housing 30 to the second housing 32. Preferably, the structural members are rigidly attached to the first and second housings forming a unitary piece therewith.

The structural member 36 may generally comprise a leading edge and a trailing edge. When fluid is forced through the gas turbine structure 28, the leading edge is located upstream of the trailing edge. As used herein, the expression "structural member direction" $D_SM$ generally relates to the direction from the first housing 30 to the second housing 32 along the leading edge of the structural member 36.

The purpose of the structural member 36 may be to inter alia to support the first and second housings 30, 32 and possibly also to transmit loads in a gas turbine.

A structural member the main purpose of which is to provide a structural support to components of a gas turbine is generally referred to as a strut. A strut often has a symmetrical cross-section in relation to a centre direction which is parallel to the core flow direction.

In other implementations of the structural member, the structural member may be adapted to divert the core gas flow, i.e. to change the direction of the core gas flow, passing the structural member. A structural member the main purpose of which is to provide a core gas flow diversion is generally referred to as a vane. A vane often has an asymmetrical cross-section in relation to a centre direction which is parallel to the core flow direction.

A structural member, be it a strut or a vane, may preferably be hollow such that it may accommodate service components such as electrical cables and/or mechanical pipes and/or such that the structural member may be used to conduct a coolant.

A gas turbine structure 28 according to the present invention may comprise a plurality of struts as well as a plurality of vanes. The FIG. 2 embodiment of the gas turbine structure 28 comprises a plurality of vanes only.

FIG. 2 further illustrates that the gas turbine structure 28 also comprises a fairing 38 circumferentially enclosing at least a portion of the structural member 36. In the shown embodiment, the fairing 38 is entirely enclosing the structural member 36. The purpose of the fairing 38 may be to inter alia reduce the thermal loads and/or impact loads from particles in the core flow on at least a portion of the structural member 36. If the fairing 38 is adapted so as to reduce the thermal loads on the structural member 36, the fairing 38 may also be referred to as a thermal shield. The fairing may preferably be made of sheet metal.

Figure 3:
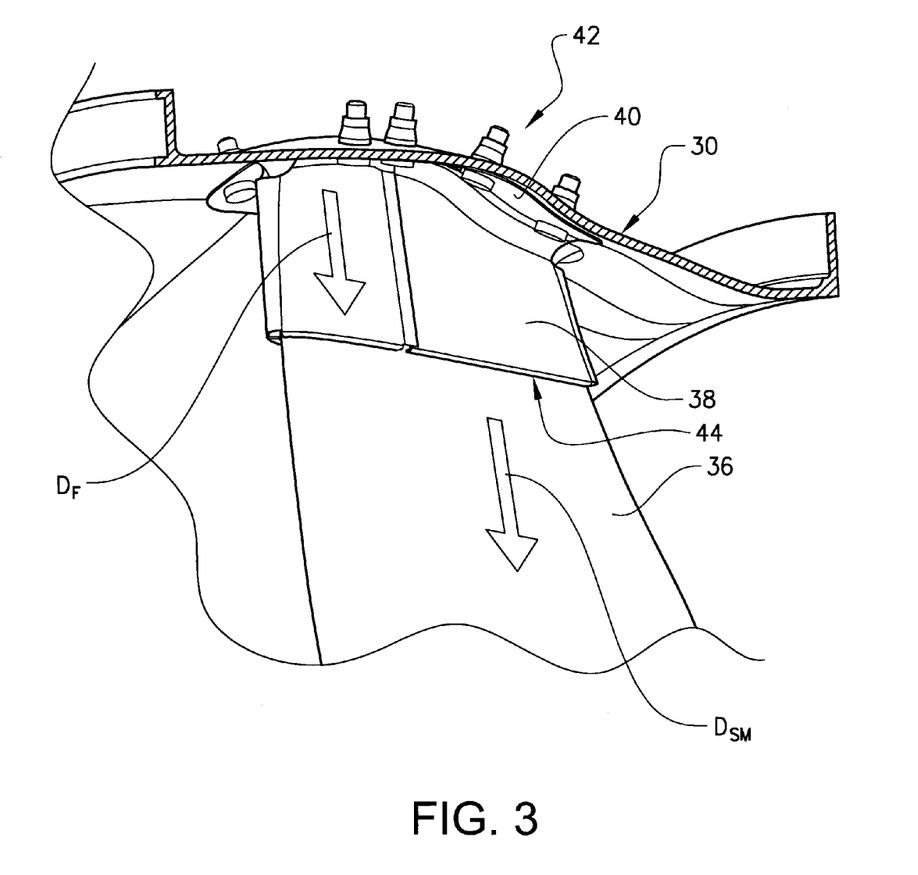
FIG. 3 illustrates a portion of the FIG. 2 gas turbine structure.

In FIG. 2, each one of a plurality of the structural members 36 disclosed therein is furnished with a fairing 38 and FIG. 2 also illustrates that the gas turbine structure 28 comprises engine mount members 33. Moreover, FIG. 2 illustrates that the structural members that are connected to engine mount members 33 may be provided without a fairing. However, in other embodiments of the gas turbine structure 28, at least one of the structural members that are connected to engine mount members 33 may be provided with a fairing according to the present invention FIG. 3 illustrates a portion of the FIG. 2 gas turbine structure 28. As may be gleaned from FIG. 3, the fairing 38 extends in a fairing direction $D_F$ which is substantially parallel to the structural member direction $D_S$ and the fairing comprises a fairing attachment portion 40, attached to the first housing 30 such that a displacement of the fairing attachment portion 40 in relation to the first housing 30 is prevented at least in the fairing direction $D_F$.

In a similar vein as for the structural member 36, the fairing may comprise a leading edge and the expression "fairing direction" $D_F$ generally relates to the direction from the first housing 30 towards the second housing 32 along the leading edge of the fairing 38.

The above attachment of the fairing 38 to the first housing 30 may be achieved in a plurality of ways. Purely by way of example, the attachment may comprise to bolt joint 42 or a rivet joint (not shown in FIG. 3). In certain implementations of the above attachment, a bolt joint 42, or any other type of releasable joint, may be preferred since a bolt joint may enable that the fairing may be replaced in a straightforward manner.

Moreover, FIG. 3 illustrates that fairing 38 comprises a fairing end portion 44 located at the other end of the fairing in the fairing extension direction $D_F$ as compared to the fairing attachment portion 40. The fairing end portion 44 is allowed to be displaced, in at least the fairing direction $D_F$, in relation to the second housing (not shown in FIG. 3).

As such, if the fairing 38 is subjected to thermal loads, e.g. from a core gas flow with a high temperature, the fairing 38 is allowed to expand such that the fairing end portion is displaced towards the second housing 32. As such, the above implementation of the fairing implies that the fairing 38 will be subjected to only moderate structural loads when the gas turbine is in use.

Figure 4:
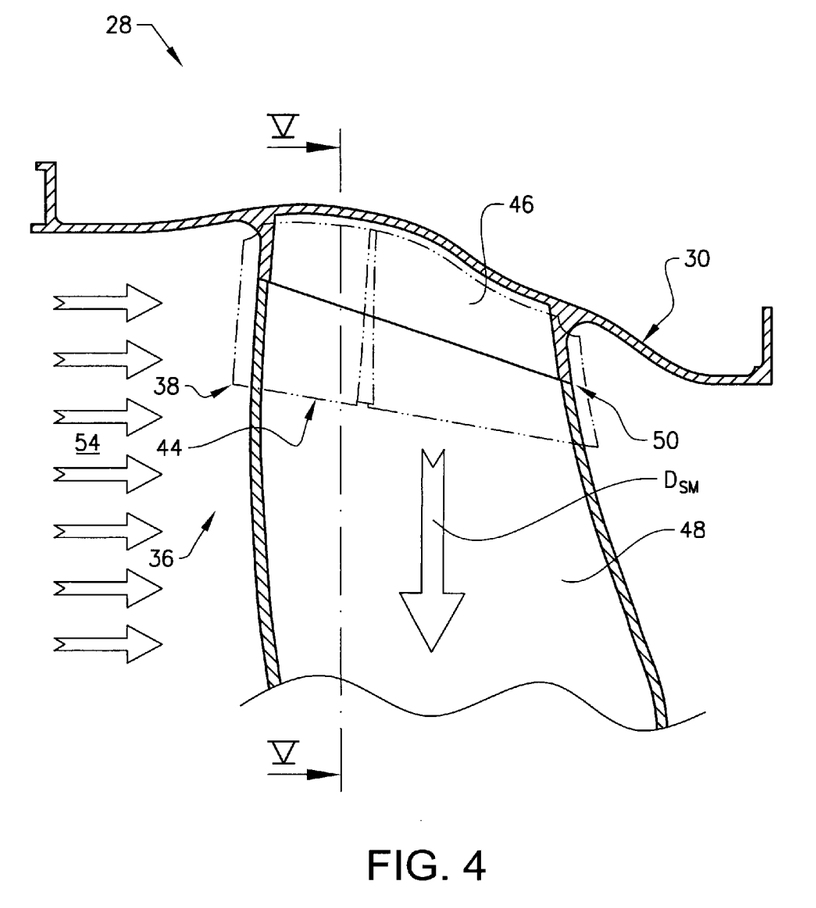
FIG. 4 illustrates a cross-section of a portion of a further embodiment of a gas turbine structure.

FIG. 4 illustrates a side view of a portion of an embodiment of the gas turbine structure 28 in which the fairing 38 is indicated with dotted lines. As may be gleaned from FIG. 4, the structural member 36 disclosed therein comprises a first stand-up 46 and an intermediate member 48. The first stand-up 46 is attached to the first housing 30 and the intermediate member 48 is attached to the first stand-up 46 by means of a first stand-up joint 50.

Moreover, FIG. 4 illustrates that least a portion of the fairing extends past the first stand-up joint 50 in the structural member direction $D_SM$—AS such, the distance from the first housing 30 to the fairing end portion 44, when measured in a direction parallel to the structural member direction $D_{SM}$, is larger than the distance from the first housing to the first stand-up joint 50.

The first stand-up 46 may be attached to the first housing 30 by means of a first housing weld joint (not shown in FIG. 4). Optionally, the first stand-up 46 and the first housing 30 may form a unitary component, as is indicated in FIG. 4, or the first stand-up 46 may be obtained by metal deposition (not shown in FIG. 4).

The first stand-up 46 may be solid or hollow and the intermediate member 48 may also be solid or hollow although a hollow intermediate member 48 may be preferred for the same reasons as for why a general strut or vane may preferably be hollow.

Since the first stand-up 46 in the FIG. 4 embodiment of the present invention is at least partially covered from a possibly hot core flow 54, the first stand-up 46 will generally not be subjected to large thermal loads. As such, the first stand-up 46 may be manufactured from a material with a lower thermal capacity as compared to the material of the intermediate member 48 and/or the fairing 38. Thus, the first stand-up 46 may by made of a material and/or have a design which focuses on providing appropriate structural characteristics to the first stand-up 46.

Figure 5:
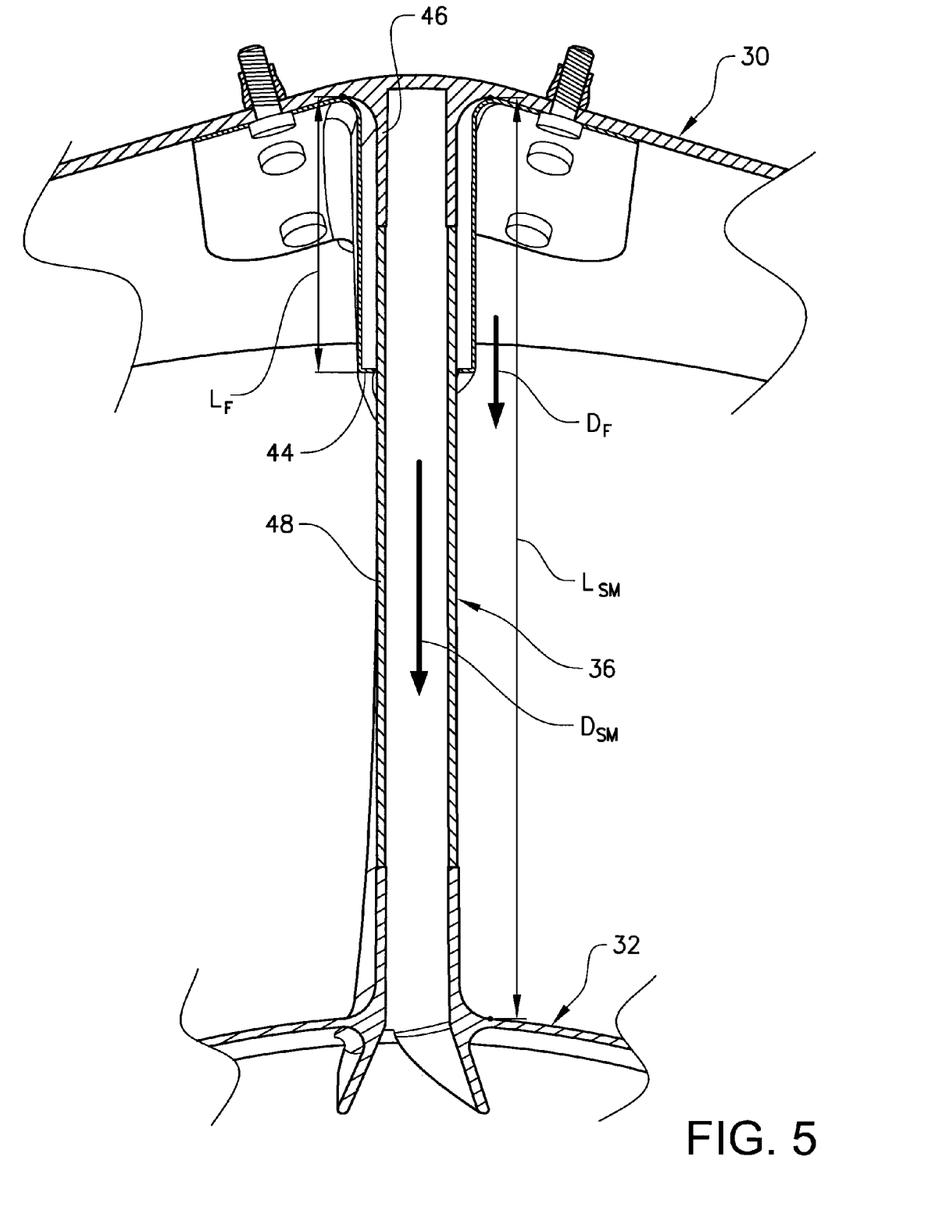
FIG. 5 illustrates a cross-section of a portion of another embodiment of a gas turbine structure.

FIG. 5 illustrates the FIG. 4 portion of an embodiment of the gas turbine structure with a cross-section taken along line V-V in FIG. 4. FIG. 5 illustrates that the structural member 36 has a structural member length $L_S$ in the structural member direction $D_{SM}$ from the first housing 30 to the second housing 32. Moreover, FIG. 5 illustrates that the fairing 38 has a fairing length $L_F$ from the first housing 30 in the fairing direction $D_F$. Moreover, FIG. 5 illustrates that the fairing length $L_F$ is smaller than the structural member length $L_{SM}$.

The fairing length $L_F$ is defined as the largest distance, in the fairing direction $D_F$, from a contacting portion of the first housing 30 to the fairing end portion 44. A contacting portion is a portion which is in contact with the fairing 38 either directly or indirectly via spacer means, or spacer, such as at least one washer.

In a similar vein, the structural member length $L_{SM}$ is defined as the largest distance, in the structural member direction $D_{SM}$, from a portion of the first housing 30, which portion is in contact with the structural member 36, to a portion of the second housing 32, which portion is in contact with the structural member 36. The above contacts could be either directly or indirectly via spacer means, or spacer, such as at least one washer.

In embodiments of the gas turbine structure 28, such as the one illustrated in FIG. 5, where the structural member 36 comprises portions thereof which may form an integral part of the first housing 30 or the second housing 32, the structural member length $L_{SM}$ may be defined as the largest distance from a first housing surface of the first housing 30 to a second housing surface of the second housing 32, where the first housing surface and the second housing surface face one another, along the structural member direction In preferred embodiments of the gas turbine structure of the present invention, the fairing length $L_F$ is less than 90%, preferably less than 50%, more preferred less than 30%, of the structural member length $L_{SM}$—In the FIG. 5 implementation of the fairing 38, the fairing length $L_F$ is approximately 30% of the structural member length $L_{SM}$.

Figure 6:
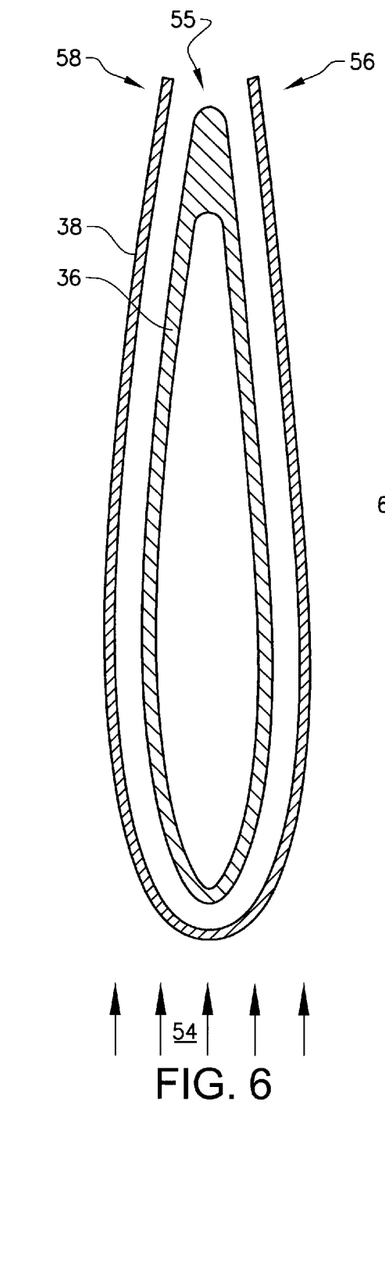
FIG. 6 illustrates a cross-section of a portion of a further embodiment of a gas turbine structure.

In order to reduce e.g. the thermal loads on at least a portion of the structural member 36, the fairing 38 should enclose at least a portion of the circumference of the structural member 36. However, in some embodiments of the present invention, it may not be required that the fairing 38 fully encloses the circumference of the structural member 36. To this end, reference is made to FIG. 6 illustrating a cross-sectional view of an implementation of a structural member 36 and a fairing 38 in which the fairing 38 comprises an opening 55 at its downstream portion, i.e. a position downstream of the core flow 54. In further implementations of the fairing 38, for instance in implementations where a low flow velocity is expected around the fairing, the trailing portions 56, 58 of the fairing may be flanging (not shown in FIG. 6).

Figure 7:
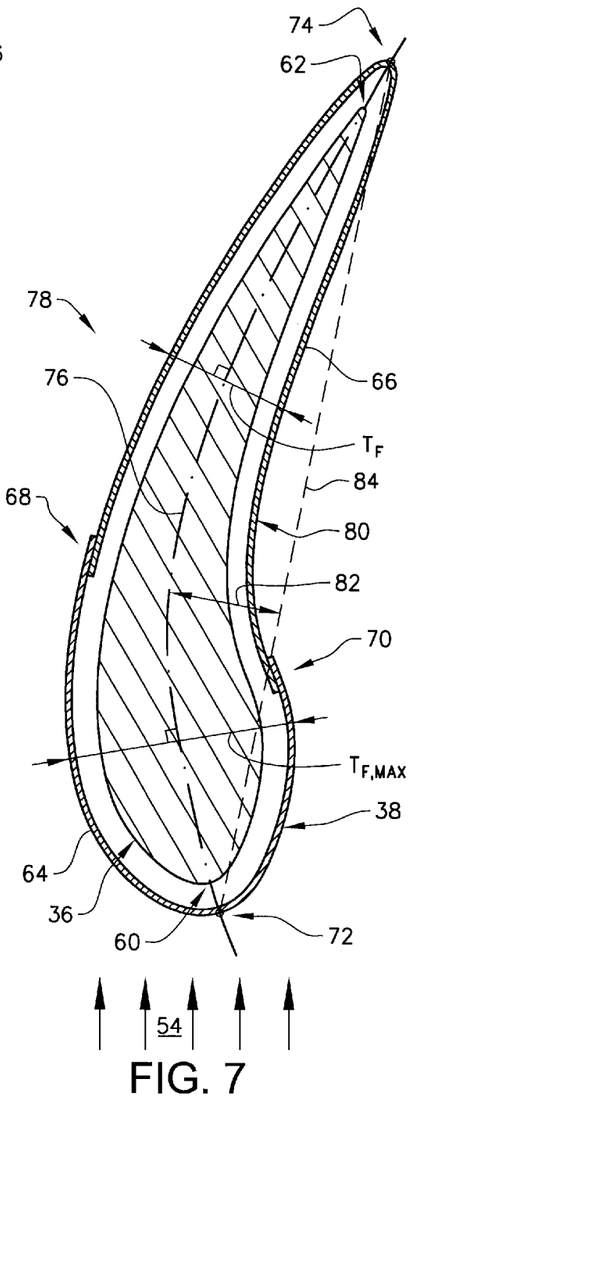
FIG. 7 illustrates a cross-section of a portion of another embodiment of a gas turbine structure.

FIG. 7 illustrates another implementation of a structural member 36 and a fairing 38. In the FIG. 7 implementation, the structural member 36 comprises a leading structural member portion 60 and a trailing structural member portion 62. The trailing structural member portion 62 is arranged to be located downstream of the leading structural member portion 60 when the gas turbine engine is operated to produce a core fluid flow 54 through the gas turbine structure.

The fairing comprises a first fairing portion 64 and a second fairing portion 66 and the first fairing portion 64 covers the leading structural member portion 60 and the second fairing portion 66 covers the trailing structural member portion 62. Moreover, the first fairing portion and the second fairing portion contact one another in a contacting area comprising a first axial split line 68 and a second axial split line 70.

Furthermore, FIG. 7 illustrates that the fairing comprises a leading edge 72 and a trailing edge 74, the fairing 38 extends from the leading edge to the trailing edge along a mean camber line 76. In the implementation illustrated in FIG. 7, the cross-section of the fairing 38 is asymmetrical with respect to the core flow direction 54. As such the mean camber line 76 is curved. However, for a fairing 38 with a symmetrical cross-section with respect to the core flow direction (not shown) in FIG. 7, the mean camber line 76 would be a straight line.

FIG. 7 further illustrates that the fairing comprises a suction side 78 and a pressure side 80 and the mean camber line 76 is defined as the locus of points halfway between the suction side 78 and the pressure side 80 as measured perpendicular to the mean camber line 76 itself. The camber 82 is identified as the maximum distance between the mean camber line 76 and a cord line 84. The cord line 84 is a straight line extending from the leading edge 72 and the trailing edge 74, wherein the maximum distance is measured in a direction perpendicular to the cord line 84.

Moreover, FIG. 7 illustrates that the fairing 38 further comprises a fairing thickness $T_F$ measured in a direction perpendicular to the mean camber line 76. Furthermore, the fairing 38 has a maximum thickness $T_F,MAX$ between the leading edge 72 and the trailing edge 74. Moreover, FIG. 7 illustrates that the first axial split line 68 is located on the suction side 78 between the maximum thickness $T_{F,M}AX$ and the trailing edge 74 when measured along the mean camber line 76.

Furthermore, FIG. 7 illustrates that the second axial split line 70 may be located on the pressure side 80 and that the second axial split line 70 may be located closer to the leading edge 72 of the fairing 38, when measured along the mean camber line 76, than the first axial split line 68. In implementations of a fairing 38, the second axial split line 70 may actually be located between the maximum thickness $T_F,MAX$ and the leading edge 72 when measured along the mean camber line 76.

Moreover, FIG. 7 illustrates that the first fairing portion 64 overlaps the second fairing portion 66 in first axial split line 68 as well as in the second axial split line 70.

Figure 8:
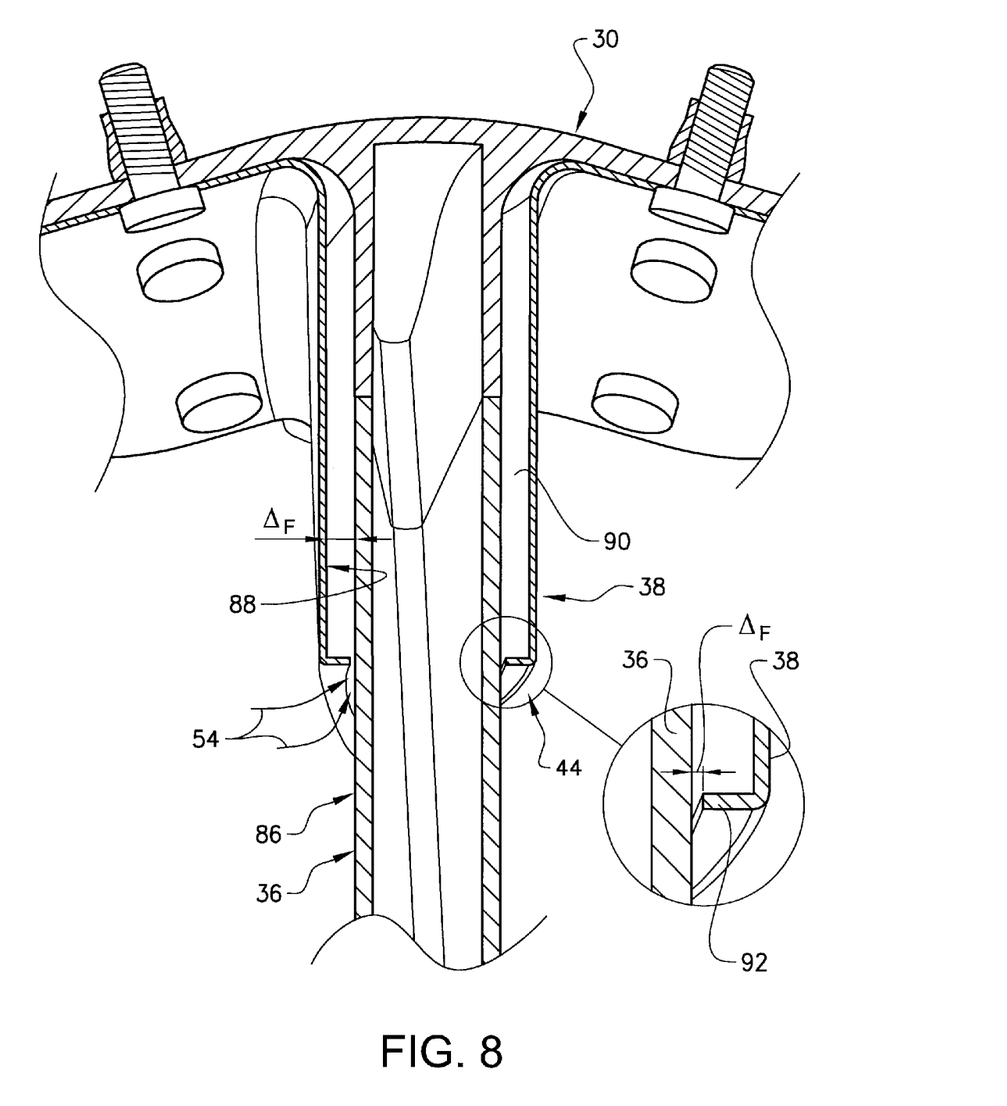
FIG. 8 illustrates a cross-section of a portion of a further embodiment of a gas turbine structure.

FIG. 8 illustrates a cross-section of a portion of a further embodiment of the present invention. In the FIG. 8 embodiment, the structural member 36 has a structural member outer surface 86 and the fairing has an inner fairing surface 88. Moreover, the gas turbine structure comprises a fairing gap $\Delta_F$ which is defined as the distance in a direction normal to the structural member outer surface 86 from the structural member outer surface 86 to the fairing inner surface 88.

If the fairing gap $A_F$ is greater than zero, an enclosed volume 90 is obtained between the structural member 36 and the fairing 38 and this enclosed volume 90 is often preferred since fluid in the enclosed volume may provide insulation for at least a portion of the structural member 36 which is covered by the fairing 38.

However, should the fairing gap $\Delta_F$ be the same throughout the length of the fairing, there is a risk that a portion of the core flow 54, which portion may comprise hot fluids, may enter the enclosed volume 90.

As such, the inventors of the present invention have realized that the gas turbine structure 28 may comprise a fairing closure 92 which may be configured such that the fairing gap $\Delta_F$ at the fairing closure is smaller than the average fairing gap $A_F$ at the remaining portion of the fairing 38. In order to obtain an appropriately low amount of fluids entering the enclosed volume 90, the fairing gap $\Delta_P$ at the fairing closure 92 may be less than 50%, preferably less that 30%, of the average fairing gap at the remaining portion of the fairing 38.

Purely by way of example, the average fairing gap $\Delta_P$ may be approximately within the range of 1-3 mm, and preferably approximately 2 mm, in order to obtain an appropriately large enclosed volume 90. Moreover, and again purely by way of example, the fairing gap $\Delta_P$ at the fairing closure 92 may be within the range of 0.4-0.8 mm, preferably approximately 0.6 mm.

The fairing closure 92 may be obtained in a plurality of ways. In the FIG. 8 implementation of the fairing 38 and support member 36, the fairing closure 92 comprises a flanged portion of the fairing 38.

Figure 9A:
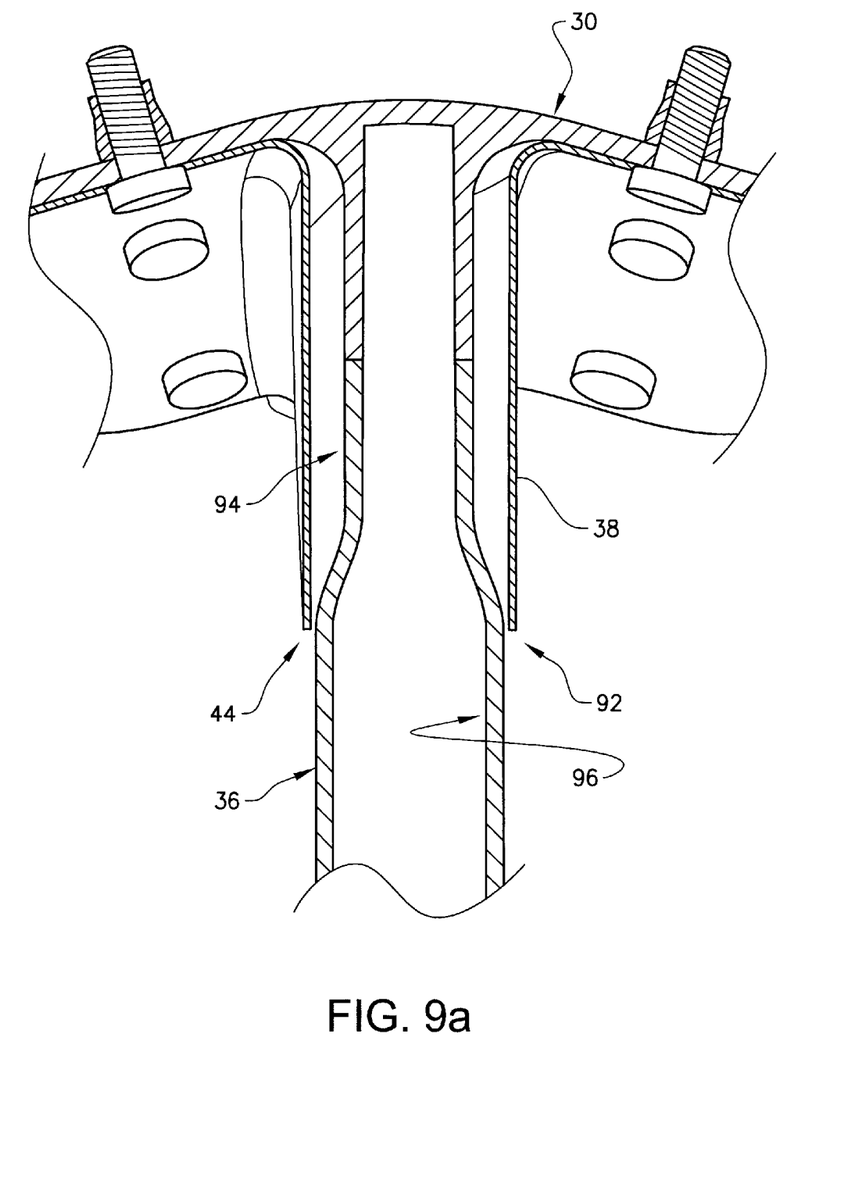
FIGS. 9a and 9b illustrate cross-sections of portions of further embodiments of a gas turbine structure.
Figure 9B:
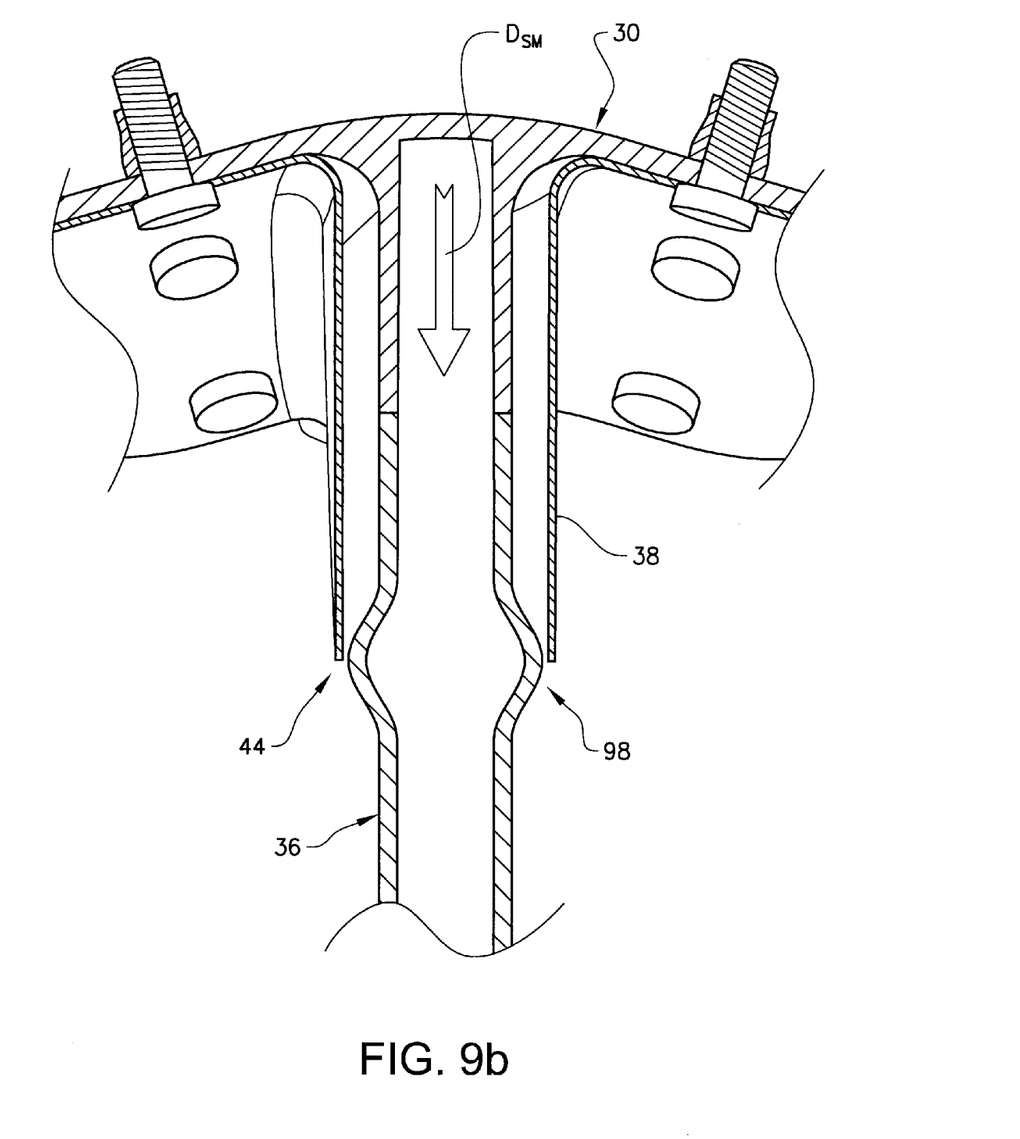

However, FIGS. 9a and 9b illustrates other implementations of the fairing closure 92. In FIG. 9a, the fairing closure 92 is obtained by increasing the cross-sectional area of the support member 36 approximately at the location of the fairing end portion 44 such that the support member 36 comprises a first portion 94 which is located closer to the first housing 30 than a second portion 96 of the support member and the first portion 94 has a smaller cross-sectional area than the second portion 96.

Instead of, or in addition to, the FIG. 9a implementation, the structural member 36 may comprise a protrusion 98 located approximately at the same level, in the structural member direction $D_SM$, as the fairing end portion 44, see FIG. 9b.

Moreover, a fairing closure 92 may be obtained by combining a flanged portion of the fairing 38 with the implementations of the fairing closure 92 illustrated in FIGS. 9a and 9b, respectively. Furthermore, a fairing closure may be obtained by combining the implementations of the fairing closure illustrated in FIG. 9a or FIG. 9b.

Figure 10:
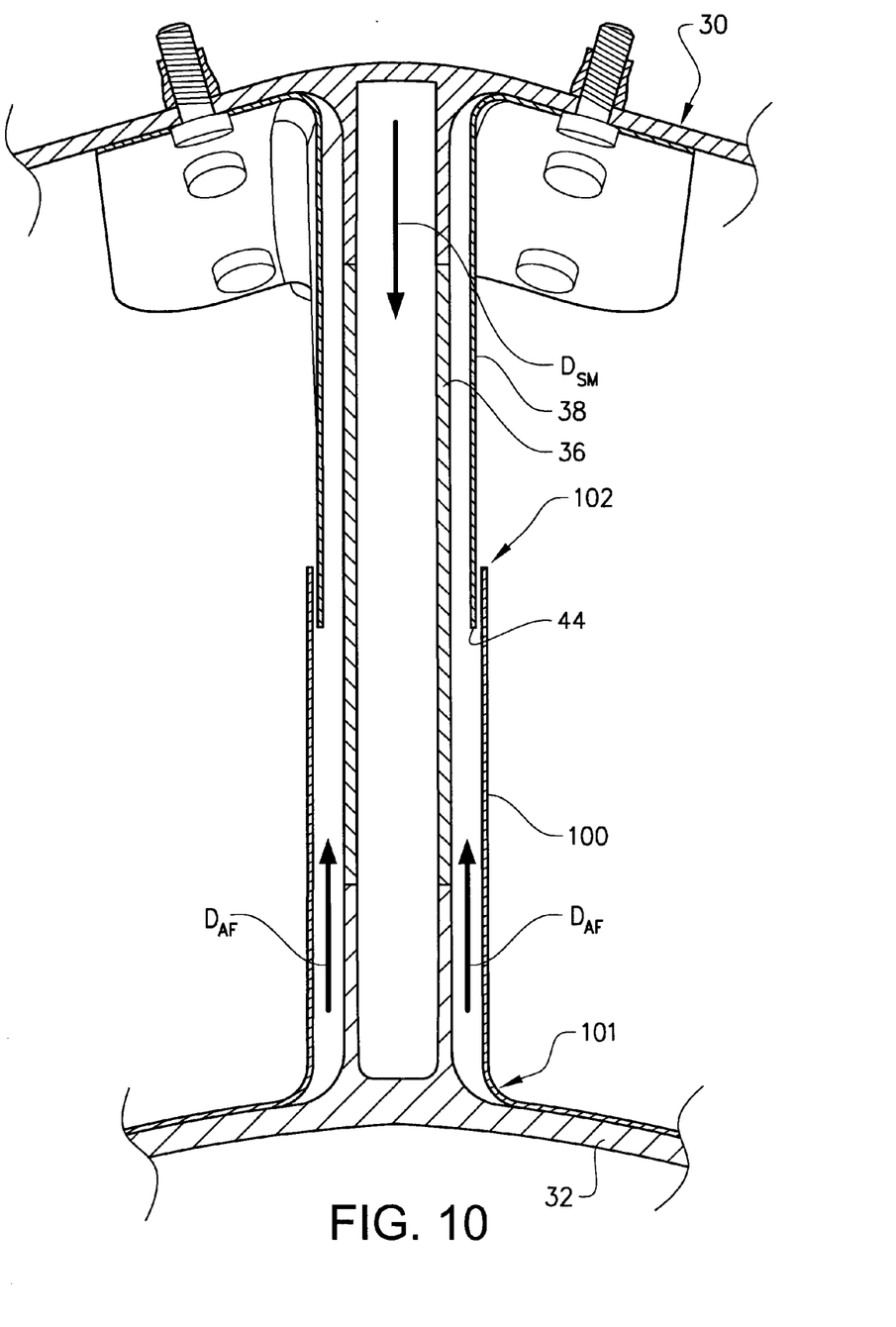
FIG. 10 illustrates a cross-section of a portion of another embodiment of a gas turbine structure.

FIG. 10 illustrates a portion of another embodiment of the gas turbine structure of the present invention. The FIG. 10 embodiment of the gas turbine structure comprises a first housing 30, a second housing 32, a structural member 36 and a fairing 38. Moreover, the FIG. 10 gas turbine structure comprises an additional fairing 100 circumferentially enclosing at least a portion of the circumference of the structural member 36.

As may be gleaned from FIG. 10, the additional fairing 100 is attached to the second housing and extends in a direction from the second housing towards the first housing. The additional fairing 100 may be designed according to any one of the above implementations of the first fairing 38, with the exception that the additional fairing is attached to the second housing 32 and has an end portion 102 which is allowed to be displaced in relation to the first housing, in at least an additional fairing direction $D_AF$ which extends in a direction at least substantially parallel to the structural member direction $D_S$.

The first fairing 38 and the additional fairing 100 may be implemented such that a gap is obtained between the end portion 44 of the first fairing 38 and the end portion 102 of the additional fairing 100. However, and as is illustrated in FIG. 10, the first fairing 38 and the additional fairing 100 may be designed such that the fairings 38, 100 overlap.

In FIG. 10, the additional fairing 100 encloses a portion of the first fairing 38, but in other implementations, a portion or the first fairing may enclose a portion of the additional fairing. Moreover, the end portion 102 of the additional fairing 100 and/or the end portion 44 of the first fairing 38 may comprise a fairing closure such that only a small gap is obtained between the fairings 38, 100.

It is to be understood that the present invention is not limited to the embodiments described above and illustrated in the drawings. For instance, although the above examples discloses a fairing 38 which is attached to an outer housing of a gas turbine structure, other embodiment of the gas turbine structure may comprise a fairing which is attached to an inner housing of the gas turbine structure. As such, the skilled person will recognize that many changes and modifications may be made within the scope of the appended claims.

The invention claimed is:

1. A gas turbine structure comprising
a first housing and a second housing, one of the first and second housings being located around the other of the first and second housings such that a core flow passage is obtained between the first and second housings
an elongate structural member extending in a structural member direction from the first housing to the second housing
a fairing circumferentially enclosing at least a portion of the structural member, the fairing having a fairing length which is less than 50% of a structural member length of said structural member, and the fairing extending in a fairing direction substantially parallel to the structural member direction, the fairing comprising a fairing attachment portion that extends along an inner circumferential face of the first housing, and is attached to the first housing such that a displacement of the fairing attachment portion in relation the first housing is prevented at least in the fairing direction, the fairing further comprising a fairing end portion located at the other end of the fairing in the fairing extension direction as compared to the fairing attachment portion, wherein the fairing end portion is allowed to be displaced, in at least the fairing direction, in relation to the second housing.

2. The gas turbine structure according to claim 1, wherein the structural member comprises a first stand-up and an intermediate member, the first stand-up being attached to the first housing and the intermediate member being attached to the first stand-up by means of a first stand-up joint, at least a portion of the fairing extending past the first stand-up joint in the structural member direction.

3. The gas turbine structure according to claim 1, wherein the structural member length extends in the structural member direction from the first housing to the second housing and the fairing length extends from the first housing in the fairing direction, the fairing length being smaller than the structural member length.

4. The gas turbine structure according to claim 1, wherein the structural member comprises a leading structural member portion and a trailing structural member portion, the trailing structural member portion being arranged to be located downstream of the leading structural member portion when the gas turbine engine is operated to produce a core fluid flow through the gas turbine structure, the fairing comprising a first fairing portion and a second fairing portion, the first fairing portion covering the leading structural member portion and the second fairing portion covering the trailing structural member portion, the first fairing portion and the second fairing portion contacting one another in a contacting area comprising a first axial split line and a second axial split line.

5. The gas turbine structure according to claim 4, wherein the fairing comprises a leading edge to the trailing edge along a mean camber line, the fairing further comprising a fairing thickness measured in a direction perpendicular to the mean camber line, the fairing having a maximum thickness between the leading edge and the trailing edge, the fairing further having a suction side and a pressure side, the first axial split line being located on the suction side between the maximum thickness and the trailing edge when measured along the mean camber line.

6. The gas turbine structure according to claim 5, wherein the second axial split line is located on the pressure side, the second axial split line being located closer to the leading edge, when measured along the mean camber line, than the first axial split line.

7. The gas turbine structure according to claim 4, wherein the first fairing portion overlaps the second fairing portion in the contacting area.

8. The gas turbine structure according to claim 1, wherein the structural member has a structural member outer surface and the fairing has an inner fairing surface, the gas turbine structure comprising a fairing gap being the distance in a direction normal to the structural member outer surface from the structural member outer surface to the fairing inner surface, the gas turbine structure comprising a fairing closure, the fairing closure being configured such that the fairing gap at the fairing closure is smaller than an average fairing gap over a remaining portion of the fairing away from the fairing closure.

9. The gas turbine structure according to claim 8, wherein the fairing gap at the fairing closure is less than 50% of the average fairing gap at the remaining portion of the fairing.

10. The gas turbine structure according to claim 8, wherein the fairing closure comprises a flanged portion of the fairing.

11. The gas turbine structure according to claim 1, wherein the gas turbine structure comprises an additional fairing circumferentially enclosing at least a portion of the circumference of the structural member, the additional fairing extending in an additional fairing direction substantially parallel to the structural member direction, the additional fairing comprising an additional fairing attachment portion attached to the second housing such that a displacement of the additional fairing attachment portion in relation to the second housing is prevented at least in the additional fairing direction, the additional fairing further comprising and an additional fairing end portion located at the other end of the additional fairing in the additional fairing extension direction as compared to the additional fairing attachment portion, the additional fairing end portion being allowed to be displaced, in at least the additional fairing direction, in relation to the first housing.

12. The gas turbine structure according to claim 1, wherein the gas turbine structure is a rear gas turbine structure.

13. A gas turbine engine comprising a gas turbine structure according to claim 1.

14. An aeroplane comprising a gas turbine engine according to claim 13.

* * * * *